United States Patent [19]
Riedel

[11] Patent Number: 5,236,543
[45] Date of Patent: Aug. 17, 1993

[54] APPARATUS FOR WELDING THE SEALING SEAM ON A PACKAGE

[75] Inventor: Thomas Riedel, Biebensheim, Fed. Rep. of Germany

[73] Assignee: Tetra Alpha Holdings S.A., Pully, Switzerland

[21] Appl. No.: 979,924

[22] Filed: Nov. 23, 1992

[30] Foreign Application Priority Data

Dec. 5, 1991 [DE] Fed. Rep. of Germany ....... 4140037

[51] Int. Cl.$^5$ ............................................. B30B 1/00
[52] U.S. Cl. ..................... 156/583.91; 156/583.1; 53/374.8; 53/374.9; 53/546; 53/202; 53/373.2; 493/207; 493/209
[58] Field of Search ................ 53/374.8, 374.9, 202, 53/546, 373.2, 373.3, 373.4, 373.5, 373.7; 156/583.1, 583.91; 493/207, 209

[56] References Cited

U.S. PATENT DOCUMENTS

| | | | |
|---|---|---|---|
| 2,803,931 | 8/1957 | David | 53/546 |
| 2,827,742 | 3/1958 | Bursak | 53/546 X |
| 2,869,298 | 1/1959 | Zwoyer | 53/546 X |
| 3,505,705 | 4/1970 | Stroop | 53/546 X |
| 4,241,560 | 12/1980 | Deimel | 53/373 X |
| 4,269,016 | 5/1981 | Koop | 53/546 X |
| 4,581,873 | 4/1986 | Knuppertz | 156/583.1 X |
| 5,034,087 | 7/1991 | Denker | 156/583.1 X |
| 5,094,657 | 3/1992 | Dworak | 493/209 X |

Primary Examiner—David A. Simmons
Assistant Examiner—Charles Rainwater
Attorney, Agent, or Firm—Joseph G. Nauman

[57] ABSTRACT

An apparatus is described for welding the sealing seam (23) on a package (24) and which consists at least partially of synthetic plastics coated paper, with a welding tool comprising dies (25, 28) and counter-dies, a support and a drive means (1) for generating the pressure force.

So that two welding tools (25, 25a) can be used and operated simultaneously and so that substantially the same pressure forces are available at both working stations, it is according to the invention envisaged that two welding dies be mounted on respective outer hollow shafts (7, 9) in such a way as to be rotatable about a common axis (2), each outer hollow shaft (7, 9) being rotationally rigidly connected to a common torsion spring (3) as part of the drive means (1) (at 14, 16, 17), the torsion spring (3) being driven from outside (at 11, 12).

6 Claims, 3 Drawing Sheets

APPARATUS FOR WELDING THE SEALING SEAM ON A PACKAGE

The invention relates to an apparatus for welding the sealing seam on a package which consists at least partially of synthetic plastics coated paper, comprising a welding tool having dies and counter-dies, a support and a drive means to generate the pressure force.

In prior art packaging machines, liquids packages are produced in large quantities per unit of time in that from a strip of synthetic plastics coated paper or cardboard a sleeve or a sleeve with a bottom is formed, closed at one end and then transported to the filling station. In the case of these prior art machines, the package which is ready to be filled stands upside down and empty, i.e. the cover which possibly incorporates the pouring device constitutes the surface on which the package is standing, while what will subsequently be the bottom of the package is at the top and is open. It is through this that the package is filled, for example with milk or juice. In the prior art machine, the filled package is conveyed from the filling station to a bottom folding station where the bottom wall panels are so placed together by means of shaping dies, sheets and the like that a double layer cardboard strip is produced in which a transverse sealing seam has to be made. Once this is made, then a package containing flowable media is also fluid-tight and can be carried away.

It is particularly at the making of this sealing seam that the invention is directed and an apparatus is proposed with which welds can be undertaken generally by means of dies and counter-dies.

To a man skilled in the art of packaging machines, it is known that sealing-tightness on the one hand and economically favourable production of sealing seams on the other is a critical point which is frequently open to improvement where the production machinery is concerned. In the case of prior art packaging machines, dies and counter-dies are moved by pneumatic or hydraulic cylinders and are so pressed together that the necessary welding force is created. Where foodstuffs have to be packaged, then hygiene is a particularly important factor which is often counteracted by lubricants. Without these, parts of the machinery which are particularly stressed suffer from wear and tear. Hydraulic systems cannot be operated unless hydraulic fluid is used and in the event of a leak the required level of hygiene is jeopardized.

Another wish which the package producer cherishes is the improvement in the economy and better utilisation of space. Producers require a particularly compact and efficient machine.

The output from a welding station of the type in question here can be doubled by making two transverse sealing seams simultaneously at the welding station. By this means, economy will be greatly improved but the machine manufacturer is also required to design so that less space is occupied and naturally the peripheral conditions already existing with previously known machines must be maintained, such as for example a guarantee of the necessary hygiene. With pneumatic and hydraulic systems, it is difficult to maintain this last-mentioned requirement and with plate spring systems it is hardly possible for two adjacently disposed welding tools to be kept properly functioning at virtually the same working pressures and high speed.

The invention is therefore based on the problem of so developing the welding apparatus mentioned at the outset that two welding tools can be simultaneously used and operated while substantially the same pressure forces are available at both working stations.

According to the invention, this problem is resolved in that two welding dies are mounted about a common axis on respective outer hollow shafts, each outer hollow shaft being rotationally rigidly connected to a common torsion spring as part of the drive means, the torsion spring being driven from outside. According to the invention, therefore, there is a departure from the prior art technique of the pneumatic or hydraulic systems and a mechanical drive is chosen which uses a torsion spring in order to press two welding dies onto counter-dies with virtually the same amount of force. In the case of the mechanical solution chosen according to the invention, no hygiene problems can arise by reason of flow media such as gases, air, oil, and the output from the filling station is nevertheless doubled in that two welding dies are rotated about a common axis and therefore pressure can be applied to them in such a way that they carry out the weld in the short time desired, and at approximately the same pressure. The finished product, for example the flowable medium package which has a sealing seam, demonstrates regularly reliable sealing-tightness in random tests and also in long-term tests.

It is particularly expedient if according to the invention both outer hollow shafts are disposed axially one behind another and are mounted both by two outer bearings and also by a common middle bearing, when the torsion spring extends in one piece over the total length from one bearing to the other and when the middle bearing is disposed axially between the two welding dies. This construction permits of symmetrical initiation of forces and also, on the output side, ensures good symmetry because each hollow shaft is supported at one end in its outer bearing and at the other in the common middle bearing, and both hollow shafts are driven at comparable locations and also divert the force, namely to the welding tools so producing the desired even distribution of pressure.

According to the invention, it is particularly advantageous if the rotationally rigid connections between torsion spring and each of the two outer hollow shafts are disposed in the region of the outer bearings. The distance between the common middle bearing and the two outer bearings may be substantially the same, so achieving symmetry in the whole arrangement. If the rotationally rigid connections are disposed in the region of the outer bearings, then the initiation of force can obviously be made at locations which are symmetrical with the middle bearing. A rotationally rigid connection can be made by a polygonal shaft, a splined shaft or even adjusting springs, as the man skilled in the art himself can select and decide upon from a multiplicity of available types of connection.

If the output from the torsion spring to the outer hollow shaft occurs in the region of the outer bearings, then according to the invention it is particularly expedient for the initiation of force to occur at the same distance from the two outer bearings, in other words substantially in the middle region. In other words, according to the invention, the torsion bar is driven in the region of its axial centre.

Expediently, the invention is further developed in that the drive of the torsion spring is constituted by a rotationally rigid connection of the spring to an inner hollow shaft which, engaging around the torsion spring, extends inside the outer hollow shaft substantially over its length and into the region of the outer bearing where it is provided with a radial drive part which emerges outwardly through the outer hollow shaft. There are two advantages which are surprisingly obvious in connection with this design. Firstly, the drive can be brought in from outside anywhere on the hollow shaft structure, in other words there where walls, machine supports and the like are available, where drives can readily be applied and can be transferred to other elements. Nevertheless, the above-mentioned symmetry of force guidance is guaranteed because the force introduced from the outer drive unit, for example a torque, is conducted through the inner hollow shaft into the region of the axial centre of the torsion spring. Secondly, from the disposition of the inner hollow shaft in the outer hollow shaft and due to the further disposition of the torsion spring which—situated in the common axis mentioned at the outset—extends through both outer hollow shafts, a man skilled in the art will recognise an encapsulated construction. Therefore, the torsion spring is situated centrally as a spring element and kept away from environmental conditions by reason of its encapsulation by the hollow shafts. This central position permits of a very hygienic solution because outer articulations, cylinders and springs in the hygiene area are advantageously avoided.

It is furthermore advantageous according to the invention if the torsion spring has a flat characteristic curve in that a considerable variation in the shape of the torsion spring produces relatively small variation in force. The most widely diverse torsion springs are available on the market. With a correct choice of spring diameter, the desired length of twist and the above-described construction can achieve an accurate subdivision of the initiated force over two force components which are derived at different locations.

Before the welding tools bear on the counter-die or on the cardboard strips subsequently disposed between the dies, the application of a rotary force produces a corresponding rotation of the front surface of the welding tool. Once the relevant welding tool has approached and has started to bear on the counter-die or on the cardboard strip disposed between the dies, the torsion spring is by further actuation of the drive and via the drive lever emerging outwardly through the outer hollow shaft rotated outwardly at both ends by further rotation of the inner hollow shaft and is thus pretensioned. This pretensioning force which results from torque and radius of action, presses the welding tools onto the mating side.

The flat characteristic curve of the torsion spring yields a relatively low force to be tapped, with a relatively large deformation or considerable variation in the angle of rotation, where the drive is initiated into the outer drive unit. Noteworthy is the small installation space in which this force conduct and distribution of the force is made possible in this narrow field of tolerance.

In practice, when a packaging machine is installed which has two axially serially disposed welding tools, it happens time and again that the front face of one tool projects by 1 or 2 mm beyond the front face of the other tool. In this case, the aforesaid flat characteristic curve according to the invention has the advantage that despite this path difference the initiation of the central force is evenly distributed over both welding tools so that both welding dies are pressed onto the oppositely disposed surface with almost the same force. The flat characteristic curve even provides the advantage that from the drive side, the effect of errors has virtually no influence in the welding area. This is importance because during the course of prolonged operation abrasion phenomena can easily occur on the drive side, i.e. bushes may fail. Such faults due to wear and tear have virtually no effect in terms of changing the force which finally provides the welding pressure between the dies. In conjunction with the above-mentioned distribution of the force flow from the middle outwards the flat characteristic curve provides for further evening-out of the force distribution at the ends, where the forces are derived. Often a variation in force or even a deviation in force between one and other of the two welding tools of just 10% is acceptable. This tolerance can be readily achieved as a result of the construction according to the invention. Tests have shown that in spite of the manufacturing tolerance of the torsion spring, a force error tolerance of a maximum of just 3% can be achieved. These measures are also valid for welding forces of about 1300 Newtons per welding side.

With the construction according to the invention, it is in particular possible to achieve the pressure during welding by an over-turn of the torsion spring. For example, when the front of the particular welding tool being used has just come in contact with the workpiece, then by further rotation of the inner hollow shaft through 10° for instance angle of rotation, an over-stroke is achieved and with it a pressure force between the two welding dies.

For exact movement, it is expedient for relatively large welding tools to be mounted by means of two spaced apart supports, e.g. by means of the aforedescribed arrangement at one end where, at the point at which the force is derived, the force is transferred to the welding dies only by a connecting bolt or such like, and at the other via a guide lever which guarantees very satisfactory parallelism during movement of the welding tool.

In contrast to conventional hydraulic systems in which, in the application according to the invention, susceptibility to breakdowns would be observed, the mechanical principle of the torsion spring which is used here means that no complicated servo-proportional technology has to be used.

In contrast to the imprecisely operating pneumatic systems, the system according to the invention is extremely accurate and rapid with the torsion spring. There is no consumption of oil or air and there is no need to watch out for leaks as with hydraulic or pneumatic systems and also abrasion and the complicated encapsulation involved with plate spring systems can advantageously be dispensed with according to the invention. It will be understood that the use of the above-described apparatus for ultrasonic welding and/or pulsed current arc welding and/or inductive welding is particularly favourable. For all these systems, the application of force in accordance with the invention can be very interesting and be relied upon to provide the advantages mentioned.

Therefore, it is quite particularly interesting if in accordance with the invention the apparatus is used for welding the double-layered cardboard strip in the transverse sealing seam of a liquids package.

Further advantages, features and possible applications of the present invention will emerge from the ensuing description of a preferred example of embodiment in conjunction with the accompanying drawings, in which.

Figure 1:
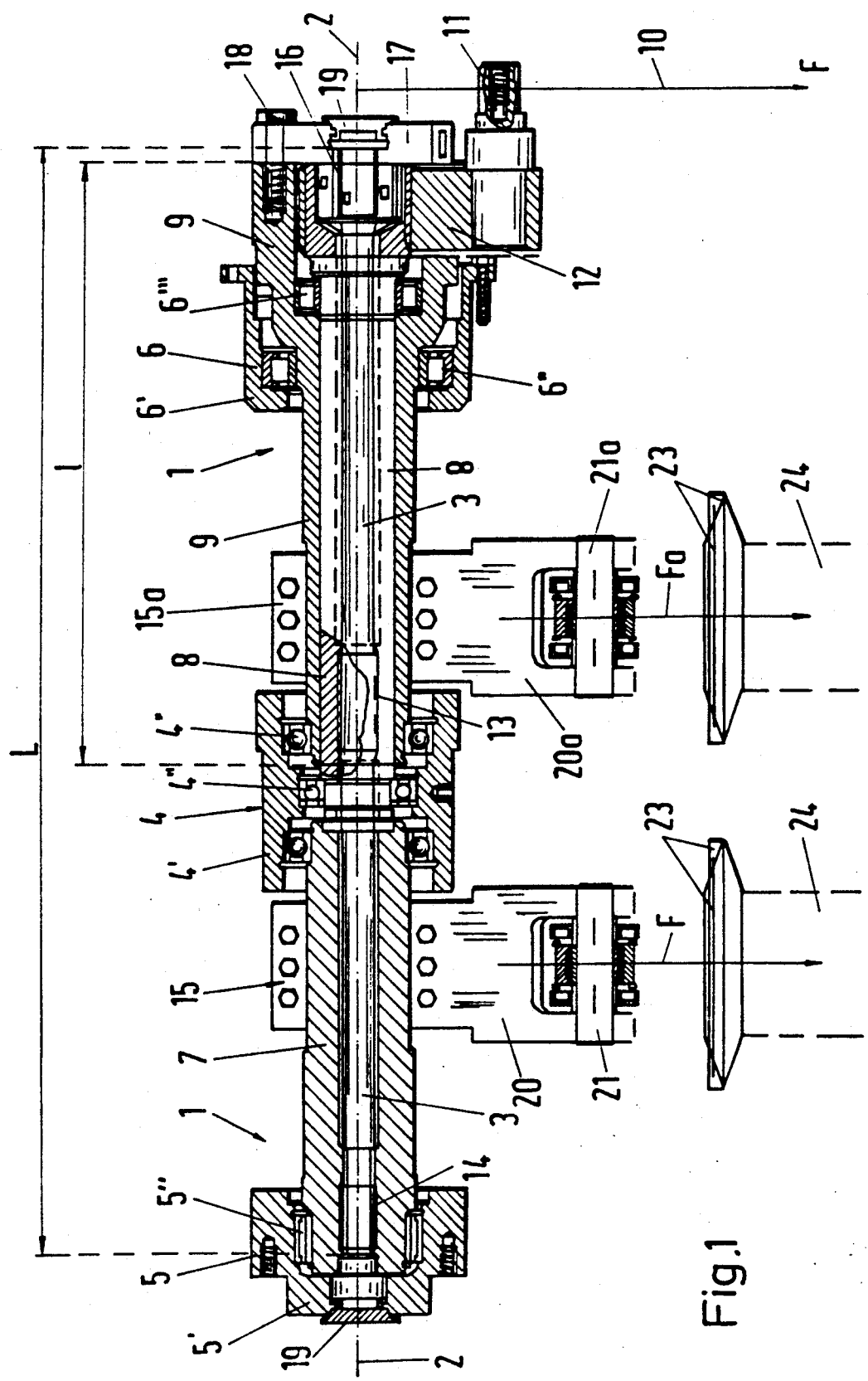
FIG. 1 is a view taken on the line I—I in FIG. 2, two welding tools and two packages which are to be welded being shown while the drive means is shown in section.

The drive means generally designated 1 consists essentially of a torsion spring 3 of high-strength steel rotatable about a common axis 2 and which is mounted substantially in the middle of its length L in a middle bearing 4 and at the ends in a left-hand outer bearing 5, for example a needle bearing 5" disposed in a rigid support 5', and a right-hand outer bearing 6, e.g. a rolling-type bearing 6" disposed in a rigid bearing bush 6'. This mounting is achieved via hollow shafts employing the construction described in greater detail hereinafter.

In the fixed middle bearing bush 4' of the middle bearing 4, ball bearings 4" support a left-hand outer hollow shaft 7 which extends leftwardly from the middle bearing 4 to the outer bearing 5 and which is coaxial with the central axis 2 and the torsion spring 3 and supported on the outer left-hand side by the described needle bearing 5" in the left-hand outer bearing 5. The middle ball bearing 4" of the middle bearing 4 supports a rightwardly extending inner hollow shaft 8 which is supported at its right-hand outer end in rolling bearings 6''' in respect of a right-hand outer hollow shaft 9. This latter in turn is mounted in the right-hand outer bearing 6 through the aforementioned roller bearing 6" and in the middle portion via the right-hand ball bearing 4" in the middle bearing 4.

The torsion spring 3 is rotationally rigidly connected to the hollow shafts. From the drive side which is in the region of the right-hand outer bearing 6, the driving force $F_{ges}$ is initiated in the direction of the arrow 10 via a drive arbor 11 by means of which a moment is applied to the right-hand inner hollow shaft 8 via a lever 12, because this lever 12 is connected to the hollow shaft 8 in the region of the right-hand outer bearing 6. In this way, therefore, the driving rotation of the right-hand inner hollow shaft 8 becomes possible. Its output side is on the left in the region of the middle bearing 4. There is shown the first rotationally rigidly connection 3 which takes the form of a polygon. The middle portion of the torsion bar 3 is of correspondingly polygonal form because this first rotationally rigid connection 13 is situated at about half the length L of the torsion bar 3 in the region of the right-hand ball bearing 4" of the middle bearing 4. It is at this rotationally rigid connection 13 that the rotary force is transmitted from the right-hand inner hollow shaft 8 to the torsion bar 3 which is therefore driven in its centre and passes the force on to its outer ends. A torsion spring effect is created in the right and left-hand halves of the torsion bar 3. The left-hand half of the torsion bar 3 extends through the outer left-hand hollow shaft 7 and is operatively engaged therewith via the second rotationally rigid connection 14. The left-hand outer end of the left-hand outer hollow shaft 7 which is supported in the left-hand outer bearing 5 therefore receives the driving force via this second rotationally rigid connection 14 and conducts it rightwardly to a clamping connection 15 at which the welding tool is provided, as will be described hereinafter.

In the middle bearing 4, via the first rotationally rigid connection 13 between the right-hand inner hollow shaft 8 and the torsion bar 3, the force in its right-hand half is guided rightwardly into the region of the right-hand outer bearing 6, actually even beyond it because the torsion spring 3 has at its right-hand end the third rotationally rigid connection 16 via which the rotary force is transferred to a coupling plate 17. This coupling plate 17 is mounted on the right-hand outer hollow shaft 9 by means of screws 18 so that via this coupling plate 17 the driving force is passed to the right-hand outer hollow shaft 9. In this latter, the force is finally guided in an axial direction into the vicinity of the middle bearing 4, namely into the clamping connection 15a which is constructed similarly to the clamping connection 15.

At the ends of the torsion spring 3, caps close off in respect of the outside ambient the support 5' and/or coupling plate 17 and the encapsulated arrangement of the torsion spring 3. This encapsulated construction of the drive means 1 can clearly be seen.

Figure 2:
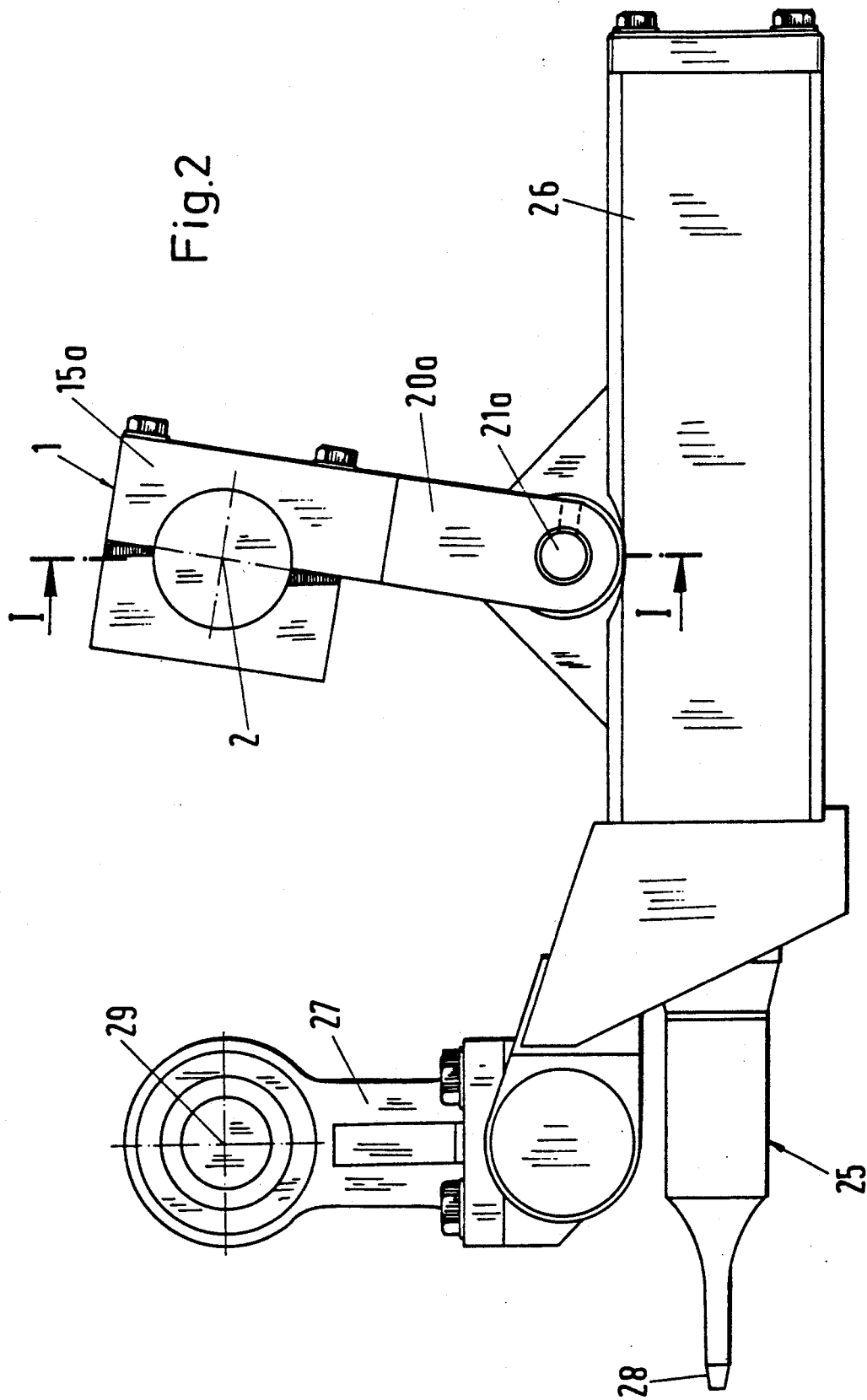
FIG. 2 is a side view of the drive means, the support and a welding tool.
Figure 3:
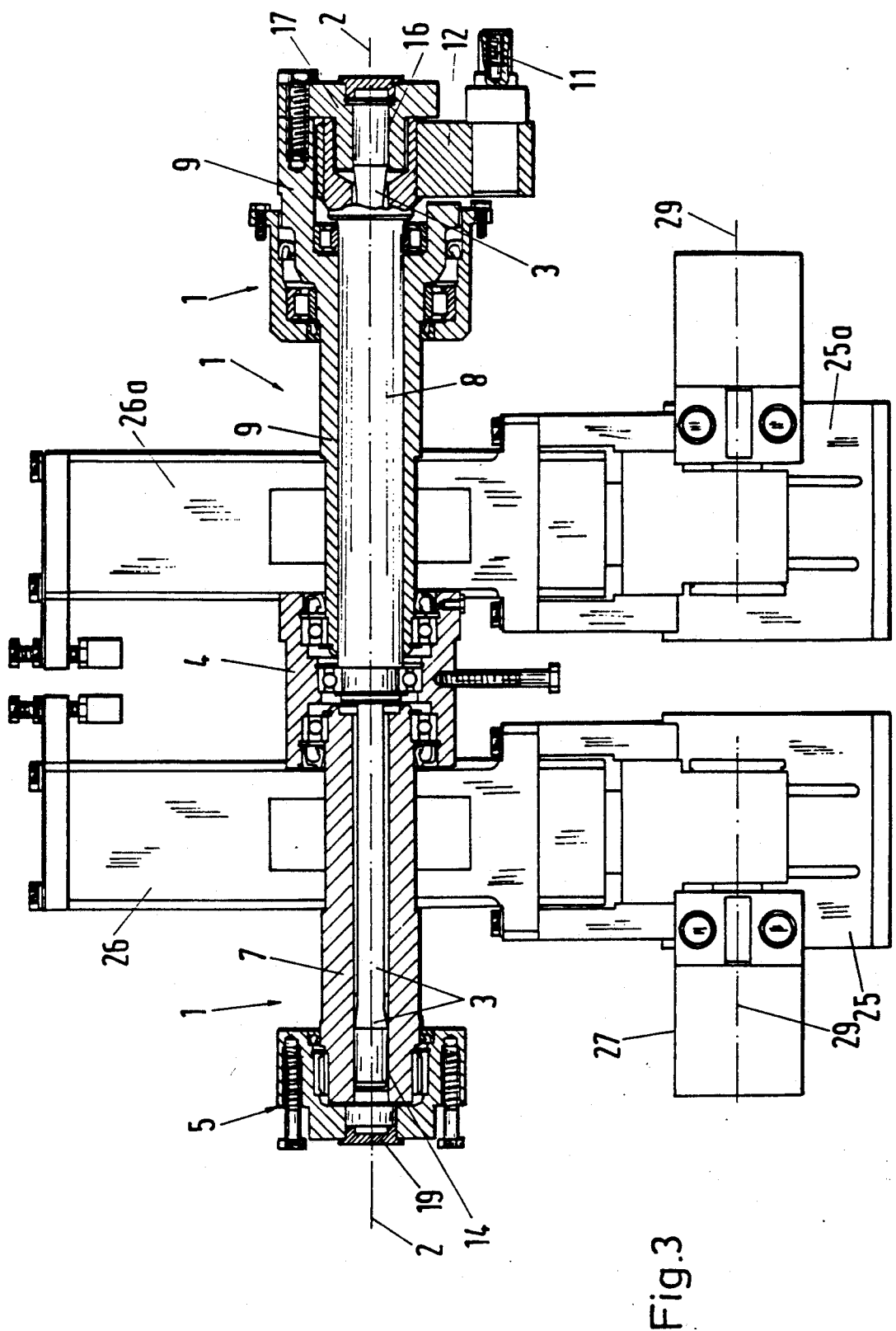
FIG. 3 is a plan view of FIG. 2 in which however the drive means is partially shown in section.

The force 10 initiated at the drive arbor 2 therefore arrives via the aforedescribed force flow paths and reaches the clamping connections 15 and 15a whence it is initiated via levers 20, 20a into the arbors 21, 21a in order thence to conduct the welding force F, Fa into the welding tools 25 and 25a shown in FIGS. 2 and 3.

The intention is to weld the sealing seam 23 shown at the bottom centre of FIG. 1 and which is part of a fluids package 24 of which the tube formed from synthetic plastics coated paper is shown by broken lines, with the bottom already partially formed into the transverse sealing seam 23.

As a welding tool for welding the seam 23, in the particularly preferred instance shown here, the ultrasonic welding is performed by a sonotrode 25. FIG. 3 shows a plan view of the view in FIG. 2, the equivalent and symmetrical disposition and suspension of the welding tools 25 being evident. Since both welding tools are of identical construction, it is sufficient to describe just one of these tools. The supports 26,26a of the welding tools 25,25a is effected via the aforementioned arbors 21 and 21a via which the force initiated from the lever 20, 20a is conducted to the welding tool 25, 26.

For a precise parallelogram movement, a guide lever 27 is furthermore mounted on the holder 26 for the welding tool farther forward towards the tip 28 of the welding tool. The guide lever 27 can be pivoted in an arc about the axis 29.

The flat characteristic curve of the torsion spring 3 should be explained by stating that in the cartesian system of co-ordinates, the angle of rotation of the torsion spring 3 should be imagined as being on the horizontal axis while the ordinate, at right-angles thereto, must be imagined as representing the force applied to the welding tool 3 via the arbors 21 and 21a in accordance with the arrows F and Fa in FIG. 1. The spring characteristic curve is flat when large values of angle of rotation correspond to relatively small values of force. The exact inclination of a straight line passing through the origin of the cartesian system of co-ordinates on the one hand and the point of rotational angle/force measurement on the other will be forthcoming according to the dimensions and material of the torsion spring.

By a juxtaposition of two welding tools 25 and 25a via the clamping connections 15, 15a, i.e. in other words one after the other in the axial direction of the torsion spring 3, it is possible to construct a compact sealing station which requires little space for power transmission. Consequently, also rapid operation can be guaranteed. In the case of a preferred and specific embodiment, in a short time of just 400 ms the sealing dies have been moved together and the welding pressure applied. In the case of this embodiment, folding, bringing of the welding tools together, applying the welding pressure, the welding itself, the subsequent cooling and the moving of the welding tools apart occurred within just 940 ms. Of this, the cooling time alone represented 100 ms. This rapid and accurate operation is possible in a small space and in a very hygienic manner, because according to the above-described construction. The arrangement is encapsulated. The effective life of the torsion spring can be further increased if a preservative, such as for example grease, is introduced into the space around the torsion spring 3 and if this torsion spring is not exposed to either a cleaning agent or any product from the welding station of the machine.

By the choice of the spring characteristic curve described and by the construction and disposition of the torsion spring, it is possible when using two welding tools, to achieve a very satisfactory parallelism which in the case of the specific embodiment measured, achieved a divergence of only a few hundredths of a millimeter.

What is claimed is:

1. An apparatus for welding the sealing seam (23) on a package (24) consisting at least partially of synthetic plastics coated paper, with welding tools (25, 25a) comprising dies and counter dies, a support (26, 27) and a drive means (1) for generating a pressure force, characterised in that two welding tools (25, 25a) are each mounted an outer hollow shaft (7, 9) adapted to rotate on a common axis (2), each outer hollow shaft (7, 9) being rotationally rigidly connected (at 14, 16, 17) to a common torsion spring (3) serving as part of the drive means (1), the torsion spring (3) being driven from outside (at 11, 12).

2. An apparatus according to claim 1, characterised in that both outer hollow shafts (7, 9) are serially disposed in the axial direction and are mounted both by two outer bearings (5, 6) and also both are mounted by a common middle bearing (4), and in that the torsion spring (3) extends in one piece over the total length (L) from one outer bearing (5, 6) to the other outer bearing and in that the middle bearing (4) is disposed axially between the two welding tools (25, 25a).

3. An apparatus according to claim 1, characterised in that the rotationally rigid connections (13, 14, 16) between torsion spring (3) and each of the two outer hollow shafts (7, 9) are disposed in the region of the two outer bearings (5, 6).

4. An apparatus according to claim 1, characterised in that the torsion spring (3) is driven in the region of its axial centre (at 13).

5. An apparatus according to claim 1, characterised in that the drive of the torsion spring (3) is constituted by a rotationally rigid connection (13) between said drive and an inner hollow shaft (8) which, engaging around the torsion spring (3), extends inside the outer hollow shaft (9) substantially over its length (1) and as far as the region of the one outer bearing (6) where it is provided with a drive part (12) emerging radially outwardly through the outer hollow shaft (9).

6. An apparatus according to claim 1, characterised in that the torsion spring (3) has a flat characteristic curve so that for a substantial variation in the shape of the torsion spring (3) only a relatively small change in its force is achieved.

* * * * *